US005093736A

United States Patent [19]

Iijima

[11] Patent Number: 5,093,736

[45] Date of Patent: Mar. 3, 1992

[54] TIME-SHARING ADDRESSING DRIVING MEANS FOR A SUPER TWISTED LIQUID CRYSTAL DISPLAY DEVICE

[75] Inventor: Chiyoaki Iijima, Suwa, Japan

[73] Assignee: Seiko Epson Corporation, Tokyo, Japan

[21] Appl. No.: 657,732

[22] Filed: Feb. 20, 1991

[30] Foreign Application Priority Data

Feb. 20, 1990 [JP] Japan .................................. 2-38758

[51] Int. Cl.[5] .......................... G02F 1/13; G09G 3/20

[52] U.S. Cl. ...................................... 359/55; 340/767; 340/784

[58] Field of Search .................... 350/332, 333, 374 E; 340/784, 767, 793

[56] References Cited

U.S. PATENT DOCUMENTS

| | | | |
|---|---|---|---|
| 3,877,017 | 4/1975 | Kawakami et al. | 340/336 |
| 4,044,346 | 8/1977 | Akahane et al. | 340/336 |
| 4,384,256 | 5/1983 | Kurahashi et al. | 340/793 |
| 4,481,511 | 11/1984 | Hanmura et al. | 340/784 X |
| 4,656,470 | 4/1987 | Saka | 350/332 X |
| 4,702,560 | 10/1987 | Endo et al. | 350/333 |
| 4,769,713 | 9/1988 | Yasui | 340/793 X |
| 4,783,653 | 11/1988 | Welzen et al. | 340/784 X |
| 4,801,933 | 1/1989 | Yamamato et al. | 340/784 |
| 4,857,906 | 8/1989 | Conner | 340/784 |
| 4,913,530 | 4/1990 | Ichimura et al. | 350/341 |
| 4,915,477 | 4/1990 | Ohta et al. | 350/333 |

*Primary Examiner*—Stanley D. Miller
*Assistant Examiner*—Huy K. Mai
*Attorney, Agent, or Firm*—Blum Kaplan

[57] ABSTRACT

A liquid crystal display device including a nematic liquid crystal material twisted between about 180° to 360° is driven by the time-sharing addressing technique at a driving waveform less than $2\sqrt{N}\cdot V$ with a bias ratio of between about $1/(\sqrt{N}-N/200)$ and $1/(\sqrt{N}-N/50)$ where $N \geqq 300$ to realize improved contrast and faster response speeds.

63 Claims, 5 Drawing Sheets

TIME-SHARING ADDRESSING DRIVING MEANS FOR A SUPER TWISTED LIQUID CRYSTAL DISPLAY DEVICE

BACKGROUND OF THE INVENTION

This invention relates to a liquid crystal display device and, more particularly, to a liquid crystal display device with a super twisted liquid crystal material.

Liquid crystal display devices and methods of driving the devices are well known in the art. The driving methods are classified into two categories. There is the static drive method and a time sharing method. In the static drive method, a signal voltage is continuously applied to the electrodes of a display device during display on the basis of "one pixel at a time". The static drive method is less than satisfactory, however, since a large number of driving elements and lead terminals are required.

In the time-sharing addressing method, the signal voltages for display are applied to the signal electrodes on a time-sharing basis for each scanning electrode so as to provide a "one line at a time" display. This driving method is widely used for it requires fewer driving elements and lead terminals than those in the static drive method. In the time-sharing addressing method, a duty ratio is expressed in general by the term 1/N. In general, N will be a large number in excess of 200 in order to satisfy the need to display large contents in the device.

In order to drive a liquid crystal display device in the time-sharing method at a duty ratio of 1/N, it has been considered most suitable to select a bias ratio of $1/(\sqrt{N}+1)$. However, this bias ratio has been selected only because it provides the maximum contrast in the display device. The selection of the bias ratio does not take into consideration or depend on the voltage of the driving signals.

If the duty ratio is lowered, the voltage of the driving signal applied must be increased. On the other hand, the integrated circuits (IC) cannot withstand a driving voltge in excess of $2\sqrt{N}\cdot V$. Thus, since the voltage applied is limited to the maximum for an integrated circuit, the device must be driven at a suitable bias ratio and the threshold voltage of the display must be lowered.

In a super twisted liquid crystal display, the display contrast quality degrades significantly with a decrease in threshold voltage of the cell. The use of the most suitable bias ratio of $1/(\sqrt{N}+1)$ causes the display contrast property to deteriorate. Additionally, there is a delay in response time of the display due to use of the conventional bias ratio.

Accordingly, it is desirable to provide a liquid crystal display utilizing a super twisted liquid crystal which has improved display contrast quality and response time when driven by a time-share addressing method which overcomes these problems associated with the prior art.

SUMMARY OF THE INVENTION

Generally speaking, in accordance with the invention, a liquid crystal display device including a super twisted liquid crystal material having a driving bias ratio of more than $1//\sqrt{N}-N/200)$ and not more than $1/(\sqrt{N}-N/50)$ is provided. A twisted nematic liquid crystal material having a twist angle between about 180° t 360° is disposed between a pair of opposed electrode substrates. The liquid crystal cell is driven in the time-sharing addressing mode at a duty ratio of 1/N (where $N \geqq 300$). The driving voltage is not more than $2\sqrt{N}\cdot V$.

Accordingly, it is an object of the invention to provide an improved super twisted liquid crystal display device.

Another object of the invention to provide a liquid crystal display device having improved contrast.

A further object of the invention is to pro,vide a liquid crystal display device having faster display response time.

A further object of the invention is to provide an improved liquid crystal display device with an integrated circuit driving circuitry and a driving voltage of not more than $2\sqrt{N}\cdot V$.

Still another object of the invention is to provide an improved super twisted liquid crystal display device having a duty ratio of 1/N, wherein N is $\geqq 300$.

Still a further object of the invention is to provide an improved super twisted liquid crystal display device. driven in the time-sharing addressing mode with a driving bias ratio of between about $1/(\sqrt{N}-N/200)$ and $1/(\sqrt{N}-N/50)$.

Still other objeots and advantaqes of the invention will, in part, be obvious and will, in part, be apparent from the specification.

The invention accordingly comprises the several steps and the relation of one or more of such steps with respect to each of the others, and the article possessing the features, properties and the relation of elements, which will be exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
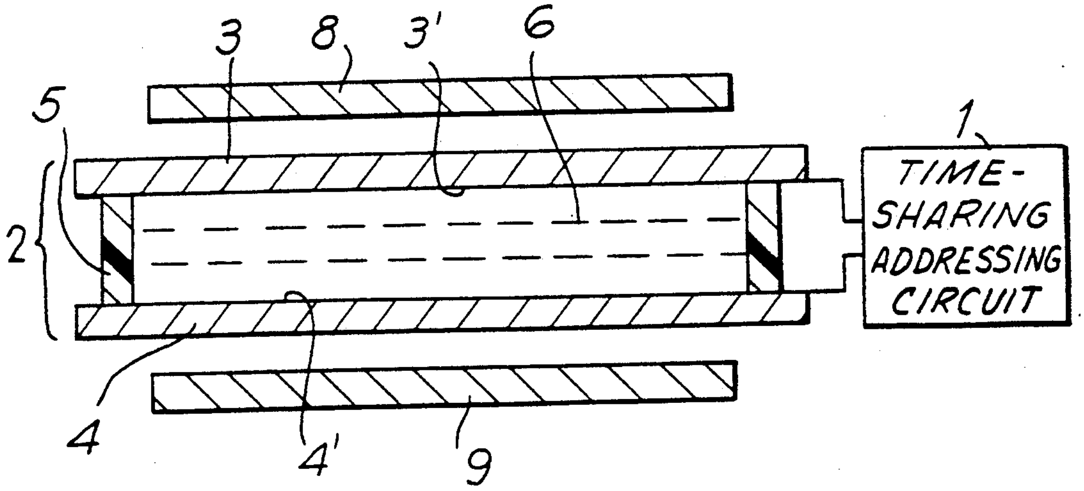
FIG. 1 is a sectional view of a liquid crystal display device in accordance with the invention.

FIG. 1 is a sectional view of a liquid crystal display device 10 constructed and arranged in accordance with the invention. Liquid crystal display device 10 includes a liquid crystal cell 2 defined by an upper electrode substrate 3 and an opposed lower electrode substrate 4. A spacer 5 keeps substrates 3 and 4 spaced apart a predetermined distance and retains a liquid crystal material 6 therein. Substrate 3 has a transparent electrode 3' on the interior surface thereof and electrode 4 has a transparent electrode 4' thereon arranged to cooperate with electrode 3'. An upper polarizing plate 8 is disposed on the outer surface of upper substrate 3 and a lower polarizing plate 9 is disposed on the outer surface of lower substrate 4. In an alternative embodiment, an optical anisotropic substance (not shown) is disposed between upper polarizing plate 8 and upper electrode substrate 3.

A time-sharing addressing circuit is connected to electrodes 3' and 4' of liquid crystal cell 2. Time-sharing address circuit 1 is an integrated circuit which generates timesharing signals to drive liquid crystal cell 2. Construction and operation of a suitable time sharing addressing circuit in accordance with the invention is disclosed in U.S. Pat. Nos. 4,044,346 and 3,877,017 which are incorporated by reference herein.

Figure 2:
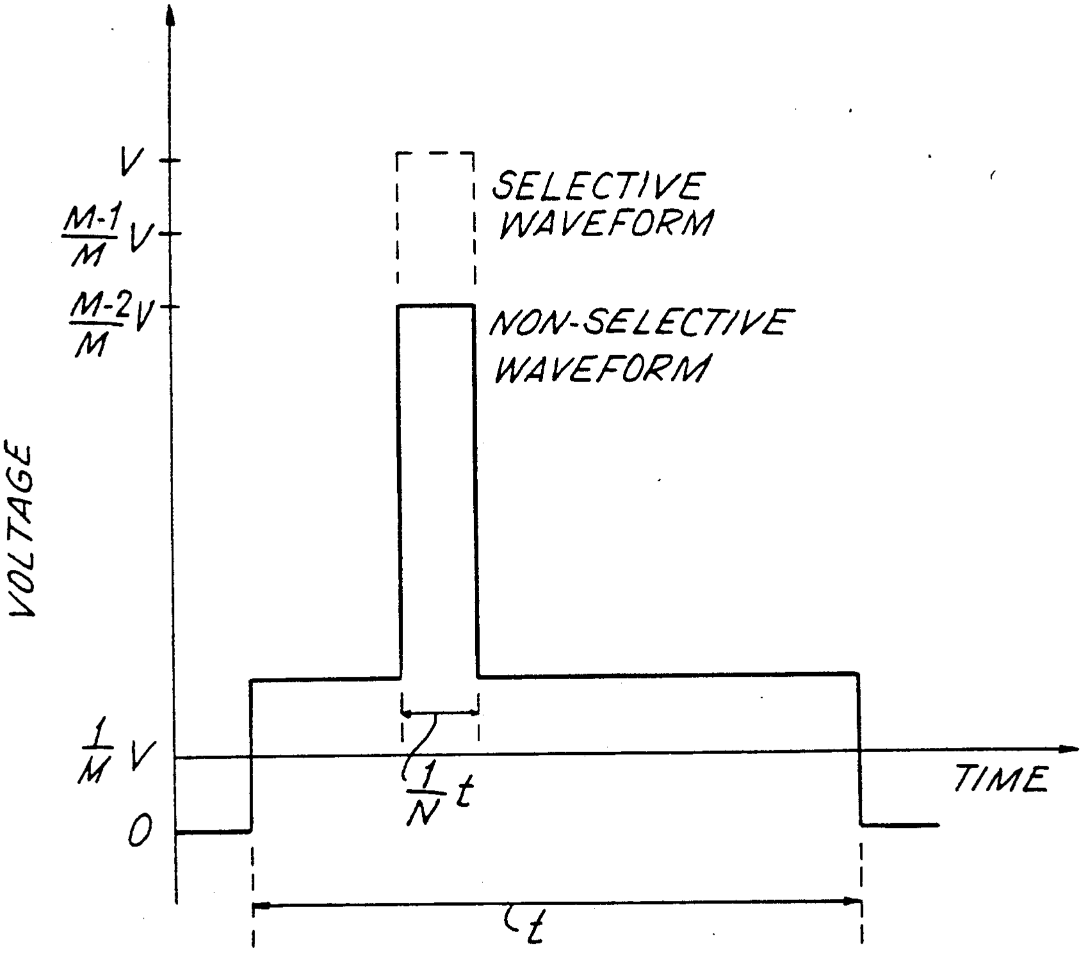
FIG. 2 is a voltage waveform for the time-sharing addressing technique used as the driving method applied to the liquid crystal display device of FIG. 1.

FIG. 2 depicts a representative waveform of the driving signals applied to liquid crystal cell 2 from the time-sharing addressing circuit 1 of liquid crystal display device 10 shown in FIG. 1. The waveform of FIG. 2 is one generated when the duty ratio is 1/N and the bias ratio is 1/M.

Figure 3:
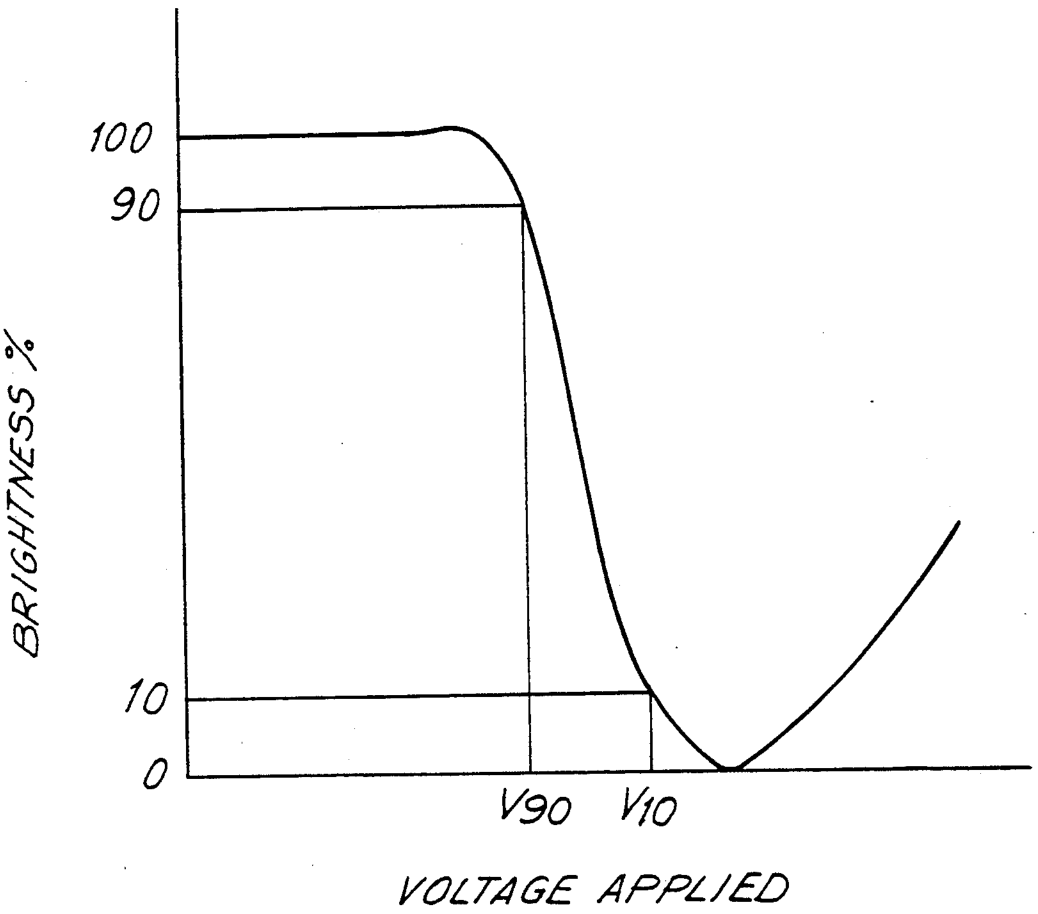
FIG. 3 is a characteristic curve of brightness versus voltage applied for the time-sharing addressing technique shown in FIG. 2.
Figure 4:
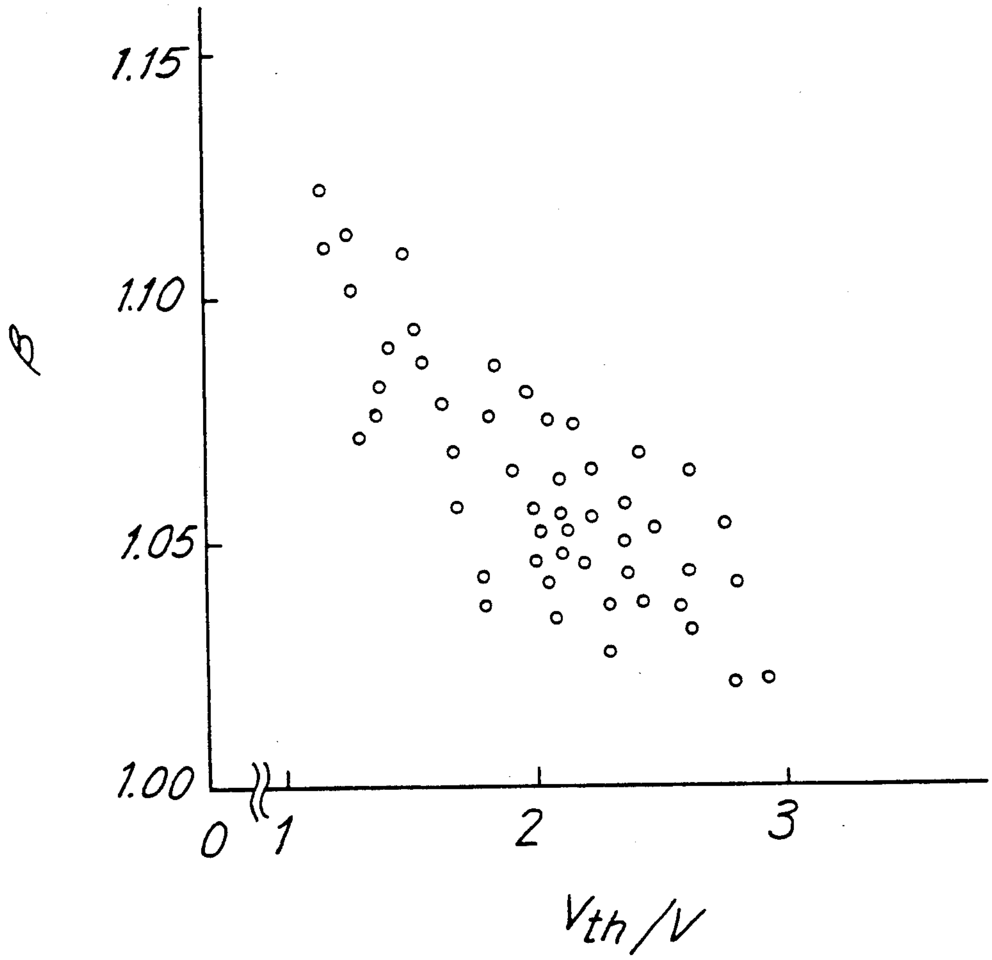
FIG. 4 is a graph of B versus the threshold voltage $V_{th}$ of the liquid crystal display device of FIG. I driven by the time-sharing assignment method in accordance with the invention.

FIG. 3 shows the brightness of liquid crystal display device 10 in FIG. 1 as a function of the voltage applied when liquid material 6 is of the super twisted type. The time-sharing addressing characteristic "$\beta$" in FIG. 4 is defined by the following equation:

$$\beta = V_{10}V_{90}$$

where $V_{10}$ is the voltage at which the brightness level reaches 10%, and $V_{90}$ is the voltage at which the brightness level reaches 90%. The value of $\beta$ is ordinarily greater than 1, and the time sharing addressing display quality improves as the value of $\beta$ approaches 1.

Furthermore, a threshold voltage $V_{th}$ can be determined from the voltage with which capacitance of the liquid crystal cell is $C_{th}$. Since $V_{th}/V = C_{th}/C$ when capacitance $C_{th}$ satisfies the following equation:

$$C_{th} = C_{0.1} + (C_5 - C_{0.1})/10,$$

where $C_{0.1}$ and $C_5$ are the capacitance when an effective voltage of 0.1 V and 5 V, respectively, is applied to the liquid crystal cell.

FIG. 4 illustrates values for B at various threshold voltages $V_{th}$ for the liquid crystal cell depicted in FIG. 1 when liquid crystal material 6 has a twist angle of 240° . As is apparent from FIG. 4, if $V_{th}$ is lowered, $\beta$ becomes large, and accordingly, the time sharing display quality of liquid crystal display device 10 is degraded. If $V_{th}$ is lowered to less than 1.8 V, the value of $\beta$ increases sharply. Consequently, the display quality deteriorates rapidly.

To determine the most suitable liquid crystal material, numerous experiments were performed, the results of which are set forth in the following Examples. Various combinations of chemical compounds were tested, and it was found that the display performance varied greatly even among liquid crystal materials having identical combinations of compounds but different ratios of the compounds. The following examples illustrate this variation in the time sharing characteristics. These examples are set forth for purposes of illustration of the invention and are not presented in a limiting sense.

EXAMPLE 1

The suitable threshold voltage $V_{th}$ is given for eight compositions designated A-H, inclusive. The eight compositions each contain the same six chemical compounds but vary in the weight percentage of the compounds.

TABLE 1

| Chemical Compound | Weight Percentage of Chemical Compound | | | | | | | |
|---|---|---|---|---|---|---|---|---|
| 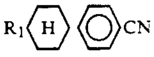 | 30 | 28 | 20 | 18 | 10 | 8 | 4 | 2 |
|  | 35 | 30 | 25 | 15 | 5 | 2 | 2 | 2 |
|  | 5 | 12 | 25 | 37 | 55 | 60 | 64 | 66 |
|  | 5 | 5 | 5 | 5 | 5 | 6 | 5 | 5 |
|  | 25 | 25 | 25 | 25 | 25 | 25 | 25 | 25 |
| Liquid Crystal | A | B | C | D | E | F | G | H |
| $V_{th}$ | 1.5 | 1.8 | 2.0 | 2.3 | 2.9 | 3.2 | 3.6 | 4.6 |

$R_1$ to $R_8$ represent straight chain alkyl groups having 1 to 9 carbon atoms.

Next, five liquid crystal display devices each containing one of the first five liquid crystals (A-E) were examined for variation in display contrast quality and response time were compared. Each display device had 400 scanning electrodes, and thus each duty ratio was $1/N = 1/400$. The driving voltaqe for each device was 25 V ($\leq 2 \times \sqrt{400}$ V). The bias ratio varied for each particular liquid crystal composition. The most suitable compositions were selected from compositions A to E in Table 1 and are set forth in Table 2 with a comparison of the characteristics devices.

TABLE 2

| Liquid Crystal | A | B | C | D | E |
|---|---|---|---|---|---|
| Bias Ratio | 1/21 | 1/17 | 1/15 | 1/12 | 1/9 |
| $\beta$ | 1.071 | 0.051 | 1.044 | 1.043 | 1.041 |
| Contrast Ratio | 8 | 10 | 11 | 10 | 8 |
| Response Speed (meters/second) | 500 | 350 | 350 | 330 | 400 |

As previously noted, liquid crystal materials have traditionally been chosen that have a bias ratio of $1/(\sqrt{N}+1)$. Since $N=400$ in this example, convention would teach the use of a liquid crystal material having a bias ratio of $1/(\sqrt{400}+1) = 1/21$, or, as seen from Table 2, liquid crystal composition A. However, Table 2 shows that a liquid crystal display device containing liquid crystal composition A is inferior to any one of the devices having liquid crystal composition with bias ratios equal to 1/17, 15 and 1/12 (liquid crystal compositions B-D) with respect to not only the contrast quality, but also the response speed. Thus, liquid crystal display devices with clearer contrast quality and faster response speeds are obtained using liquid crystal compositions having a bias ratio ranging from $1/(\sqrt{N} - N/200)$ to $1(\sqrt{N} - N/50)$. Preferably, for optimum contrast quality and display response speed, the liquid crystal display device contains a liquid crystal having a bias ratio ranging from $1/(\sqrt{N} - N/150)$ to $1/(\sqrt{N} - N/75)$.

EXAMPLE 2

In this example, five liquid crystal display devices were compared as in Table 2 of Example I, except the driving voltage was increased to 40 V, the bias ratio of the liquid crystal compositions was redetermined. The most suitable of the devices containing liquid crystal compositions selected from composition A to H from Table 1 are compositions D to H. The display characteristics of these five liquid crystal display devices are shown in Table 3 below.

TABLE 3

| Liquid Crystal | D | E | F | G | H |
|---|---|---|---|---|---|
| Bias Ratio | 1/21 | 1/17 | 1/15 | 1/12 | 1/9 |
| $\beta$ | 1.043 | 1.041 | 1.038 | 1.037 | 1.035 |
| Contrast Ratio | 15 | 17 | 19 | 18 | 16 |
| Response Speed (meters/second) | 300 | 280 | 280 | 290 | 310 |

As is apparent from Table 3, the liquid crystal display device containing liquid crystal composition D, which would conventionally be considered to have the most suitable bias ratio of 1/21 ($=1/(\sqrt{400}+1)$), is inferior to devices containing liquid crystal compositions having bias ratios of 1/17, 1/15 and 1/12 (liquid crystal compositions E-G) with respect to not only the contrast quality but also the response speed. Again, liquid crystal display devices with clearer contrast quality and faster response speed are obtained using liquid crystals having a bias ratio ranging from $1/(\sqrt{N}-N/200)$ to $1/(\sqrt{N}-N/50)$.

EXAMPLE 3

The suitable threshold voltage $V_{th}$ is given in Table 4 for five more liquid crystal compositions, designated I-M. The five compositions each contain the same five chemical compounds, but vary in the weight percentage of the compounds. The t;wist angle of each liquid crystal ccmposition in the display device was 270°.

TABLE 4

| Chemical Compound | Weight Percentage of Chemical Compound | | | | |
|---|---|---|---|---|---|
|  | 35 | 30 | 20 | 25 | 20 |
|  | 35 | 30 | 25 | 20 | 15 |
| 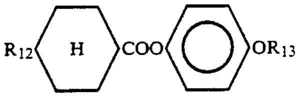 | 5 | 10 | 15 | 25 | 35 |
| 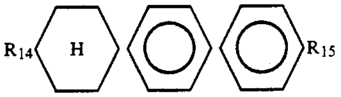 | 5 | 5 | 5 | 5 | 5 |
| 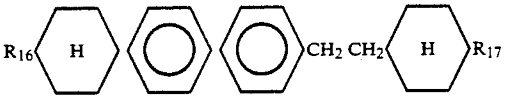 | 20 | 25 | 25 | 25 | 25 |
| Liquid Crystal | I | J | K | L | M |
| $V_{th}$ | 1.4 | 1.7 | 1.8 | 2.0 | 2.4 |

$R_{10}$ to $R_{17}$ represent straight chain alkyl groups having 1 to 9 carbon atoms.

The display characteristics of the five liquid crystal compositions I to M were examined. Each composition was included in a display device having 500 electrodes. Thus, the duty ratio of each device was $1/N=1/500$. The driving voltage for each device was 25 V ($\leq 2\times\sqrt{500}$ V), and the bias ratio was determined for each particular liquid crystal and is given in Table 5 along with the performance comparisons.

TABLE 5

| Liquid Crystal | I | J | K | L | M |
|---|---|---|---|---|---|
| Bias Ratio | 1/23.4 | 1/19 | 1/17 | 1/14 | 1/11 |
| $\beta$ | 1.051 | 1.035 | 1.028 | 1.023 | 1.020 |
| Contrast Ratio | 9 | 12 | 14 | 12 | 8 |
| Response Speed (meters/second) | 700 | 400 | 400 | 450 | 500 |

As previously noted, liquid crystal materials have traditionally been chosen that have a bias ratio of $1/(\sqrt{N}+1)$. Since $N=500$ in this example, convention would teach the use of a liquid crystal material having a bias ratio of $1/(\sqrt{500}+1)=1/23.4$, or, as seen from Table 5, liquid crystal I. However, Table shows that a liquid crystal display device containing liquid crystal oomposition I is inferior to any device having liquid crystal compositions with bias ratios equal to 1/19, 1/17 and 1/14 (liquid crystal compositions J-L) with respect to not only the contrast quality, but also the response speed. Thus, liquid crystal display devices with clearer contrast quality and faster response speeds are obtained using liquid crystal compositions having a bias ratio ranging from $1/(\sqrt{N}-N/200)$ to $1(\sqrt{N}-N/50)$.

EXAMPLE 4

The suitable threshold voltage $V_{th}$ was determined for five more liquid crystal compositions, designated N-R, and is set forth in Table 6. The five compositions each contain the same five chemical compounds but vary in the weight percentage of the compounds. The twist angle of each liquid crystal composition was 300°.

TABLE 6

| Chemical Compound | Weight Percentage of Chemical Compound | | | | |
|---|---|---|---|---|---|
|  | 35 | 30 | 30 | 25 | 20 |
| 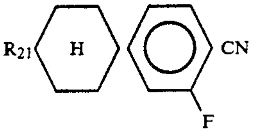 | 20 | 20 | 15 | 10 | 10 |
| 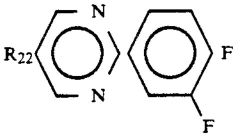 | 15 | 10 | 10 | 10 | 5 |
| 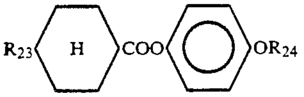 | 5 | 15 | 18 | 25 | 30 |
| 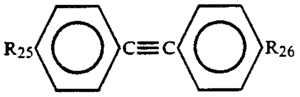 | 5 | 5 | 7 | 10 | 15 |
|  | 10 | 10 | 10 | 10 | 10 |
|  | 10 | 10 | 10 | 10 | 10 |
| Liquid Crystal | N | O | P | Q | R |
| $V_{th}$ | 1.4 | 1.7 | 1.8 | 1.9 | 2.4 |

$R_{20}$ to $R_{30}$ represent straight chain alkyl groups having 1 to 9 carbon atoms.

The display contrast qualities and response times were compared for the five liquid crystal compositions N to R, inclusive. Each display device had 500 scanning electrodes with a duty ratio, 1/N=1/500. The driving voltage for each device was 25 V ($\leq 2\times\sqrt{500}$ V), and the bias ratio was determined for each particular liquid crystal composition and is set forth in Table 7 along with the performance characteristics.

TABLE 7

| Liquid Crystal | N | O | P | Q | R |
|---|---|---|---|---|---|
| Bias Ratio | 1/23.4 | 1/19 | 1/17 | 1/14 | 1/11 |
| β | 1.049 | 1.032 | 1.025 | 1.020 | 1.018 |
| Contrast Ratio | 10 | 12 | 15 | 15 | 11 |

TABLE 7-continued

| Liquid Crystal | N | O | P | Q | R |
|---|---|---|---|---|---|
| Response Speed (meters/second) | 800 | 500 | 500 | 500 | 550 |

As previously noted, liquid crystal materials have traditionally been chosen that have a bias ratio of $1/(\sqrt{N}+1)$. Since N=500 in this example, convention would teach the use of a liquid crystal material having a bias ratio of $1/(\sqrt{500}+1)=1/23.4$, or, as shown in Table 7, liquid crystal composition N. However, the results in Table 7 show that a liquid crystal display device containing liquid crystal composition N is inferior to devices including liquid crystal compositions with bias ratios equal to 1/19, 1/17 and 1/14 (liquid crystals compositions O-Q) with respect to not only the contrast quality, but also the response speed. Again, liquid crystal display devices with clearer contrast quality and faster response speeds are obtained using liquid crystal compositions having a bias ratio ranging from $1/(\sqrt{N}-N/200)$ to $1(\sqrt{N}-N/50)$.

EXAMPLE 5

The suitable threshold voltage $V_{th}$ for five more liquid crystal compositions, designated S–W, is set forth in Table 8. The five compositions each contain the same five chemical compounds, but vary in the weight percentage of the compounds. The twist angle of each liquid crystal composition in the device was 240°.

TABLE 8

| Chemical Compound | Weight Percentage of Chemical Compound | | | | |
|---|---|---|---|---|---|
| 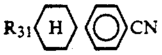 | 25 | 20 | 15 | 10 | 3 |
| 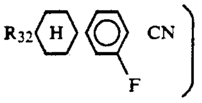 | 15 | 10 | 6 | 2 | 2 |
| 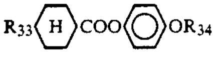 | 30 | 40 | 49 | 58 | 65 |
|  | 10 | 10 | 10 | 10 | 10 |
|  | 20 | 20 | 20 | 20 | 20 |
| Liquid Crystal | S | T | U | V | W |
| $V_{th}$ | 2.2 | 2.5 | 2.7 | 3.0 | 3.8 |

$R_{31}$ to $R_{38}$ represent straight chain alkyl groups having 1 to 9 carbon atoms.

The display contrast qualities and resonse times of the five liquid crystal display devices were compared. Each display device had 480 scanning electrodes, and a duty ratio of 1/N=1/480. The driving voltage for each device was 35 V($\leqq 2\times\sqrt{480}$V), and the bias ratio was determined for each particular liquid crystal composition and is set forth in Table 9 along with the performance characteristics.

TABLE 9

| Liquid Crystal | S | T | U | V | W |
|---|---|---|---|---|---|
| Bias Ratio | 1/22.9 | 1/18 | 1/16 | 1/14 | 1/9 |
| $\beta$ | 1.051 | 1.047 | 1.045 | 1.043 | 1.039 |
| Contrast Ratio | 10 | 12 | 12 | 12 | 9 |
| Response Speed (meters/second) | 500 | 460 | 450 | 480 | 550 |

As previously noted, liquid crystal materials have traditionally been chosen that have a bias ratio of $1/(\sqrt{N}+1)$. Since N=480 in this example, convention would teach the use of a liquid crystal material having a bias ratio of $1/(\sqrt{480}+1)=1/22.9$, or, as seen from Table 9, liquid crystal S. However, the results in Table 9 show that a liquid crystal display device containing liquid crystal composition S is inferior to devices having bias ratios equal to 1/18, 1/16 and 1/14 (liquid crystal compositions T–V) with respect to not only the contrast quality, but also the response speed. Again, liquid crystal display devices with clearer contrast quality and faster response speeds are obtained from devices including liquid crystal compositions having a bias ratio ranging from $1/(\sqrt{N}-N/200)$ to $1(\sqrt{N}-N/50)$.

Figure 5:
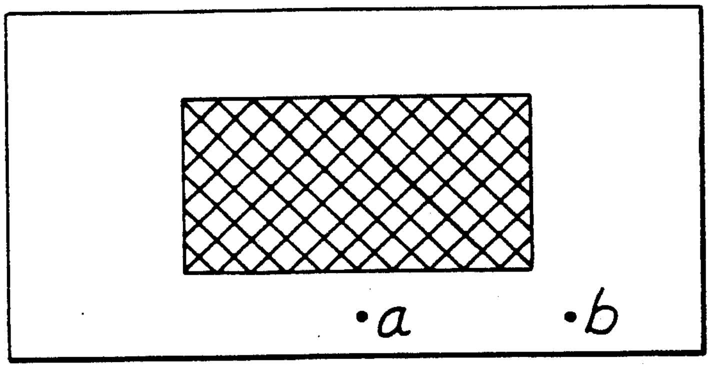
FIGS. 5–7 are frontal views of display pictures generated by liquid crystal display devices.
Figure 6:
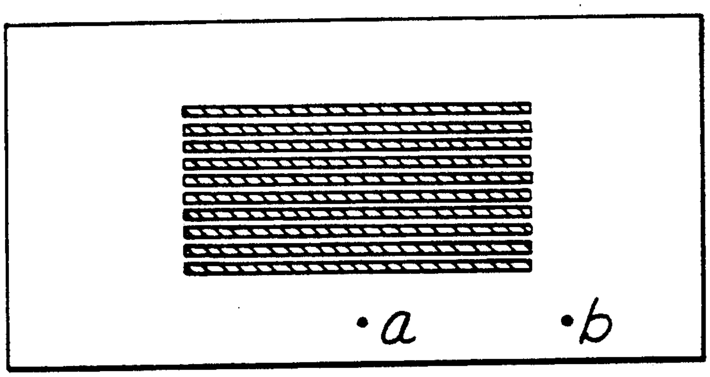
Figure 7:
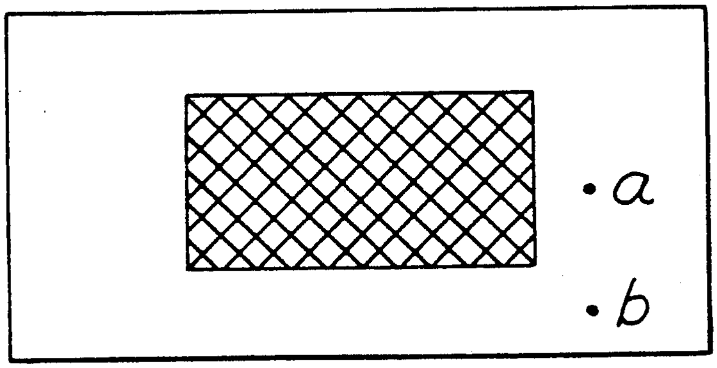

The irregularity of brightness, known as cross-talk, was compared for liquid crystal display devices containing liquid crystal compositions S-U, and the results are shown in FIGS. 5–7. Cross-talk occurs because of the contrast differences in the display picture between non-selected and selected portions at the intersection of scanning electrode lines (the column of electrodes in one substrate) and signal electrode lines (the row of electrodes in the other substrate). In order to test for cross-talk, a display as shown in FIG. 5, 6 and 7 is displayed in each display device.

The difference of transmittance rates (ΔT) in percent (%) between the pixel "a" and pixel "b" in FIGS. 5, 6 and 7 are determined. This is compared to transmittance rate when the device is driven by a voltage to provide the best contrast in the display. Therefore, the larger ΔT (%) makes it easier to observe cross-talk. For each liquid crystal S–U, $\Delta T_1$ is the ΔT determined in the display of FIG. 5, $\Delta T_2$ is the ΔT determined in the display of FIG. 6, $\Delta T_1$ is the ΔT determined in the display of FIG. 7. The values for $\Delta T_1$, $\Delta T_2$ and $\Delta T_3$ are set forth in Table 10.

TABLE 10

| Liquid Crystal | S | T | U |
|---|---|---|---|
| Bias Ratio | 1/22.9 | 1/18 | 1/16 |
| $\Delta T_1$ (%) | 3.0 | 2.9 | 2.7 |
| $\Delta T_2$ (%) | 50.2 | 49.3 | 46.0 |
| $\Delta T_3$ (%) | 7.2 | 6.9 | 6.0 |

As seen from Table 10, less cross-talk was observed in the display containing the liquid crystal composition S which would conventionally considered to be "best", i.e. having a bias ratio of $1\sqrt{N}+1$. However, as previously noted, a more uniform display picture was obtained in devices containing compositions T or U or a liquid crystal composition having a bias ratio of $1/(\sqrt{N}-N/200)$ to $1/(\sqrt{N}-N/50)$.

EXAMPLE 6

In this example, liquid crystal display devices were compared as in previous examples, except N=300 with a duty ratio, N=1/300, the driving voltage was 30 V ($\leqq 2\times\sqrt{300}$ V), and the bias ratios of the liquid crystal material was varied. The display contrast and response speed of the liquid crystal display devices were better when the bias ratio of the liquid crystal used was $1/(\sqrt{N}-N/200)$ to $1/(\sqrt{N}-N/50)$, similar to the previous examples.

EXAMPLE 7 (Comparison)

In this example, the display characteristics of two liquid crystal display devices with compositions designated U and V were compared. As in Table 9 of Example 5. The value for N was changed to 200 so that the duty ratio, 1/N=1/200, and the driving voltage was decreased to 28 V ($\leqq 2\times\sqrt{200}$ V). The bias ratios of the liquid crystal compositions was redetermined and the display characteristics of the two liquid crystal display devices are shown in Table 11 below.

TABLE 11

| Liquid Crystal | U | V |
|---|---|---|
| Bias Ratio | 1/15.1 | 1/13 |
| $\beta$ | 1.045 | 1.043 |
| Contrast Ratio | 20 | 20 |
| Response Speed (meters/second) | 320 | 330 |

As is apparent from Table 11, the liquid crystal display device containing liquid crystal composition U, which would conventionally be considered to have the most suitable bias ratio of 1/15.1 ($=1/(\sqrt{200}+1)$), has approximately the same contrast quality as the device containing liquid crystal composition V having a bias ratio of 1/13 (i.e., a bias ratio ranging from $1/(\sqrt{N}-N/200)$ to $1/(\sqrt{N}-N/50)$). Moreover, the device containing liquid crystal composition U, the composition with conventional bias ratio,has an even quicker response speed than the device containing liquid crystal V. This fact indicates that if the number of electrodes is less than 300, such as N=200, a bias ratio ranging from $1/(\sqrt{N}-N/200)$ to $1/(\sqrt{N}-N/50)$ does not provide the best results.

Thus, the effects of the invention are not fully realized in a liquid crystal display device when the duty ratio is less than 1/N=1/300, or in other words, the number ot electrodes is not more than 300. If this criterion is met, then the ideal liquid crystal material used in the device has a bias ratio ranging from $1/(\sqrt{N}-N/200)$ to $1/(\sqrt{N}-N/50)$.

In summary, in order to obtain the benefits of improved display in accordance with the invention, the liquid crystal display device has a duty ratio of 1/N where $N \geqq 300$. The device contains a nematic supertwisted liquid crystal composition and is driven by the time-sharing addressing method with a voltage of less than $2\sqrt{N}\cdot V$. In this liquid crystal display device, the liquid crystal material bias ratio is determined to range from $1/(\sqrt{N}-N/200)$ to $1/(\sqrt{N}-N/50)$, and preferably from $1/(\sqrt{N}-N/150)$ to $1/(\sqrt{N}-N/75)$ and to be driven at a driving voltage not more than $2/\sqrt{N}$ V. A liquid crystal display device in accordance with the invention will have a higher display contrast and faster response speed than conventional liquid crystal display devices. These devices in accordance with the invention are also effective to allow lower current to operate the display.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display device comprising:

a liquid crystal cell including a pair of spaced apart electrode substrates and nematic liquid crystal material filling the space between the substrates, said material having a twist angle ranging from about 180° to 360°; and time-sharing addressing driving means having a duty ratio of about 1/N ($N \geqq 300$) and for applying a driving waveform having a bias ratio at least equal to or greater than about $1/(\sqrt{N}-N/200)$.

2. The liquid crystal display device of claim 1, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

3. The liquid crystal display device of claim 1, wherein the bias ratio is equal to or less than about $1/(\sqrt{N}-N/50)$.

4. The liquid crystal display device of claim 1, wherein the bias ratio is equal to or greater than about $1/(\sqrt{N}-N/150)$.

5. The liquid crystal display device of claim 4, wherein the bias ratio is equal to or less than about $1/(\sqrt{N}-N/75)$.

6. The liquid crystal display device of claim 2, wherein the second voltage waveform serves as the driving waveform having an amplitude less than $2\sqrt{N}$ volts.

7. The liquid crystal display device of claim 2, further including a pair of polarizing plates disposed on the outer sides of the first and second substrates.

8. The liquid crystal display device of claim 2, wherein said second time-sharing addressing driving means applies a second voltage waveform to each of said second electrodes when said first voltage waveform is applied to one of said first electrodes.

9. The liquid crystal display device of claim 8, wherein said nematic liquid crystal material has a th.reshold level at least equal to or greater than an effective value of about 1.8 volts.

10. The liquid crystal display device of claim 3, wherein the bias ratio is equal to or greater than about $1/(\sqrt{N}-N/150)$.

11. The liquid crystal display device of claim 1, wherein the bias ratio is equal to or less than about $1/(\sqrt{N}-N/75)$.

12. The liquid crystal display device of claim 3, wherein the pair of spaced apart electrode substrates includes a first substrate having N first electrodes and a second substrate having second electrodes, and wherein said time-sharinq addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

13. The liquid crystal display device of claim 12, wherein the second voltage waveform serves as the driving waveform having an amplitude less than $2\sqrt{N}$ volts.

14. The liquid crystal display device of claim 4, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

15. The liquid crystal display device of claim 14, wherein the second voltage waveform serves as the driving waveform having an amplitude less than $2\sqrt{N}$ volts.

16. The liquid crystal display device of claim 5, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

17. The liquid crystal display device of claim 16, wherein the second voltage waveform serves as the driving waveform having an amplitude less than $2\sqrt{N}$ volts.

18. The liquid crystal display device of claim 10, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

19. The liquid crystal display device of claim 18, wherein the second voltage waveform serves as the driving waveform having an amplitude less than $2\sqrt{N}$ volts.

20. The liquid crystal display device of claim 11, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

21. The liquid crystal display device of claim 20, wherein the second voltage waveform serves as the driving waveform having an amplitude less than $2\sqrt{N}$ volts.

22. The liquid crystal display device of claim 12, wherein said second time-sharing addressing driving means applies a second voltage waveform to each of said second electrodes when said first voltage waveform is applied to one of said first electrodes.

23. The liquid crystal display device of claim 22, wherein said nematic liquid crystal material has a threshold level at least equal to or greater than an effective value of about 1.8 volts.

24. The liquid crystal display device of claim 16, wherein said second time-sharing addressing driving means applies a second voltage waveform to each of said second electrodes when said first voltage waveform is applied to one of said first electrodes.

25. The liquid crystal display device of claim 24, wherein said nematic liquid crystal material has a threshold level at least equal to or greater than an effective value of about 1.8 volts.

26. The liquid crystal display device of claim 6, wherein said second time-sharing addressing driving means applies a second voltage waveform to each of said second electrodes when said first voltage waveform is applied to one of said first electrodes.

27. The liquid crystal display device of claim 26, wherein said nematic liquid crystal material has a threshold level at least equal to or greater than an effective value of about 1.8 volts.

28. The liquid crystal display device of claim 17, wherein said second time-sharing addressing driving means applies a second voltage waveform to each of said second electrodes when said first voltage waveform is applied to one of said first electrodes.

29. The liquid crystal display device of claim 28, wherein said nematic liquid crystal material has a threshold level at least equal to or greater than an effective value of about 1.8 volts.

30. The liquid crystal display device of claim wherein the nematic liquid crystal material is a composition of multiple compounds having a response speed of less than 500 ms.

31. A liquid crystal display device comprising:

a liquid crystal cell including a pair of spaced apart electrode substrates and nematic liquid crystal material filling the space between the substrates, said material having a twist angle ranging from about 180° to 360°;

a pair of polarizing plates disposed on the outer sides of the liquid crystal cell; and time-sharing addressing driving means having a duty ratio of about 1/N ($N \geqq 300$) and for applying a driving waveform having a bias ratio between about $1/(\sqrt{N}-N/200)$ and $1/(\sqrt{N}-N/50)$ and an amplitude less than $2\sqrt{N}$ volts.

32. The liquid crystal display device of claim 31, wherein the pair of spaced apart electrode substrates includes a first substrate having N first electrodes and a second substrate having second electrodes, and wherein said time-sharing addressing driving means includes a first time-sharing addressing driving means for applying a first voltage waveform having a duty ratio of about 1/N to said first electrodes and a second time-sharing addressing driving means for applying a second voltage waveform having a bias ratio at least equal to or greater than about $1/(\sqrt{N}-N/200)$ to said second electrodes.

33. The liquid crystal display device of claim 32, wherein said second time-sharing addressing driving means applies a second voltage waveform to each of said second electrodes when said first voltage waveform is applied to one of said first electrodes.

34. The liquid crystal display device of claim 33, wherein said nematic liquid crystal material has a threshold level at least equal to or greater than an effective value of about 1.8 volts.

35. A method of driving a liquid crystal display device, said liquid crystal display device including a liquid crystal cell including a pair of spaced apart electrode substrate's and nematic liquid crystal material filling the space between the substrates, said material having a twist angle ranging from about 180° to 360°, said method comprising the steps of:

applying to the electrode substrates at a duty ratio of 1/N ($N \geqq 300$) a voltage having a bias ratio at least equal to or greater than about $1/(\sqrt{N}—N/200$.

36. The method of claim 35, wherein the bias ratio is equal to or less than about $1/(\sqrt{N}—N/50)$.

37. The method of claim 35, wherein the bias ratio is equal to or greater than about $1/(\sqrt{N}—N/150)$.

38. The method of claim 37, wherein the bias ratio is equal to or less than about $1/(\sqrt{N}-N/75)$.

39. The method of claim 35, wherein the pair of spaced apart electrode substrates includes a first substrate having N first electrodes and a second substrate having second electrodes, and wherein the duty ratio is applied to said first electrodes with a first voltage waveform and the bias ratio is applied to said second electrodes with a second voltage waveform.

40. The method of claim 39, wherein the second voltage waveform serves as the driving waveform having an amplitude less than $2\sqrt{N}$ volts.

41. The method of claim 36, wherein the bias ratio is equal to or greater than about $1(\sqrt{N}-N/150)$.

42. The method of claim 35, wherein the bias ratio is equal to or less than about $1/(\sqrt{N}-N/75)$.

43. The method of claim 36, wherein the pair of spaced apart electrode substrates includes a first substrate having N first electrodes and a second substrate having second electrodes, and wherein the duty ratio is applied to said first electrodes with a first voltage waveform and the bias ratio is applied to said second electrodes with a second voltage waveform.

44. The method of claim 43, wherein the second voltage waveform serves as the driving waveform having an amplitude less than $2\sqrt{N}$ volts.

45. The method of claim 37, wherein the pair of spaced apart electrode substrates includes a first substrate having N first electrodes and a second substrate having second electrodes, and wherein the duty ratio is applied to said first electrodes with a first voltage waveform and the bias ratio is applied to said second electrodes with a second voltage waveform.

46. The method of claim 45, wherein the second voltage waveform serves as the driving waveform having an amplitude less than $2\sqrt{N}$ volts.

47. The method of claim 38, wherein the pair of spaced apart electrode substrates includes a first substrate having N first electrodes and a second substrate having second electrodes, and wherein the duty ratio is applied to said first electrodes with a first voltage waveform and the bias ratio is applied to said second electrodes with a second voltage waveform.

48. The method of claim 47, wherein the second voltage waveform serves as the driving waveform having an amplitude less than $2\sqrt{N}$ volts.

49. The method of claim 41, wherein the pair of spaced apart electrode substrates includes a first substrate having N first electrodes and a second substrate having second electrodes, and wherein the duty ratio is applied to said first electrodes with a first voltage waveform and the bias ratio is applied to said second electrodes with a second voltage waveform.

50. The method of claim 49, wherein the second voltage waveform serves as the driving waveform having an amplitude less than $2\sqrt{N}$ volts.

51. The method of claim 42, wherein the pair of spaced apart electrode substrates includes first substrate having N first electrodes and a second substrate having second electrodes, and wherein the duty ratio is applied to said first electrodes with a first voltage waveform and the bias ratio is applied to said second electrodes with a second voltage waveform.

52. The method of claim 51, wherein the second voltage waveform serves as the driving waveform having an amplitude less than $2\sqrt{N}$ volts.

53. The method of claim 39, further including applying said second voltage waveform to each of said second electrodes when the first voltage waveform is applied to one of said first electrodes.

54. The method of claim 53, further including selecting a nematic liquid crystal material having a threshold level at least equal to or greater than an effective value of about 1.8 volts.

55. The method of claim 45, further including applying said second voltage waveform to each of said second electrodes when the first voltage waveform is applied to one of said first electrodes.

56. The method of claim 55, further including selecting a nematic liquid crystal material having a threshold level at least equal to or greater than an effective value of about 1.8 volts.

57. The method of claim 40, further including applying said second voltage waveform to each of said second electrodes when the first voltage waveform is applied to one of said first electrodes.

58. The method of claim 57, further including selecting a nematic liquid crystal material having a threshold level at least equal to or greater than an effective value of about 1.8 volts.

59. The method of claim 41, further including applying said second voltage waveform to each of said second electrodes when the first voltage waveform is applied to one of said first electrodes.

60. The method of claim 59, further including selecting a nematic liquid crystal material having a threshold level at least equal to or greater than an effective value of about 1.8 volts.

61. The method of claim 50, further including applying said second voltage waveform to each of said second electrodes when the first voltage waveform is applied to one of said first electrodes.

62. The method of claim 61, further including selecting a nematic liquid crystal material having a threshold level at least equal to or greater than an effective value of about 1.8 volts.

63. The method of claim 35, further including selecting a nematic liquid crystal material which is a composition of multiple compounds having a response speed of less than 500 ms.

* * * * *